United States Patent [19] [11] 3,913,694
Forsgren [45] Oct. 21, 1975

[54] SUSPENSION APPARATUS FOR GROUND ENGAGING DRIVE TRACKS
[75] Inventor: Lyle M. Forsgren, Fond du Lac, Wis.
[73] Assignee: Brunswick Corporation, Skokie, Ill.
[22] Filed: Apr. 1, 1974
[21] Appl. No.: 456,478

[52] U.S. Cl. .................................. 180/5 R; 305/24
[51] Int. Cl. .............................................. B62d 53/10
[58] Field of Search ............. 180/5 R, 9.54; 305/16, 305/17, 18, 22, 24, 27, 28

[56] References Cited
UNITED STATES PATENTS

| | | | |
|---|---|---|---|
| 3,613,810 | 10/1971 | Hetteen | 180/5 R |
| 3,613,811 | 10/1971 | Brandli | 180/5 R |
| 3,707,198 | 12/1972 | Pierson | 180/9.54 |
| 3,711,164 | 1/1973 | Chaumont | 305/24 |
| 3,727,709 | 4/1973 | Newman | 305/24 |
| 3,744,583 | 7/1973 | Bedard | 305/24 |
| 3,788,412 | 1/1974 | Vincent | 180/5 R |

Primary Examiner—Philip Goodman
Assistant Examiner—John A. Carroll
Attorney, Agent, or Firm—Andrus, Sceales, Starke & Sawall

[57] ABSTRACT

A slide-rail suspension system for the drive track of a snowmobile is coupled to the chassis by a linking arm unit pivotally attached to a forward anchor axle to follow an arc prescribed by the linking arm unit. A pair of rear spring and shock absorbing units, each includes a bell crank pivotally connected to an aft portion of the slide rail unit with a relatively long arm connected to a fixed rear axle by a slot coupling. The short arms of the bell crank unit are connected by a piston-cylinder shock absorber to the slide rail unit. A preload coil spring encircles the shock absorber. A bump engagement initiates a sliding movement of the long bell crank with the resulting increase in the shock and spring rate to increase the impact absorbing ability. The short crank arm pivots with the force axis becoming perpendicular to shock absorber to increase the spring and shock rates. A front shock assembly includes a bell-crank and shock absorber unit and a pair of separate torsion spring means which also create a variable shock rate and spring rate. The long arm of the bell crank is connected by a sliding coupling to the front pivot axle. The short arm extends upwardly and is coupled to a shock absorber which is secured at the opposite end to the front end of the slide rail unit. The torsion springs are wound about the front axle with a lower spring arm slidably engaging the slide rail unit and an upper spring arm engaging the chassis.

20 Claims, 6 Drawing Figures

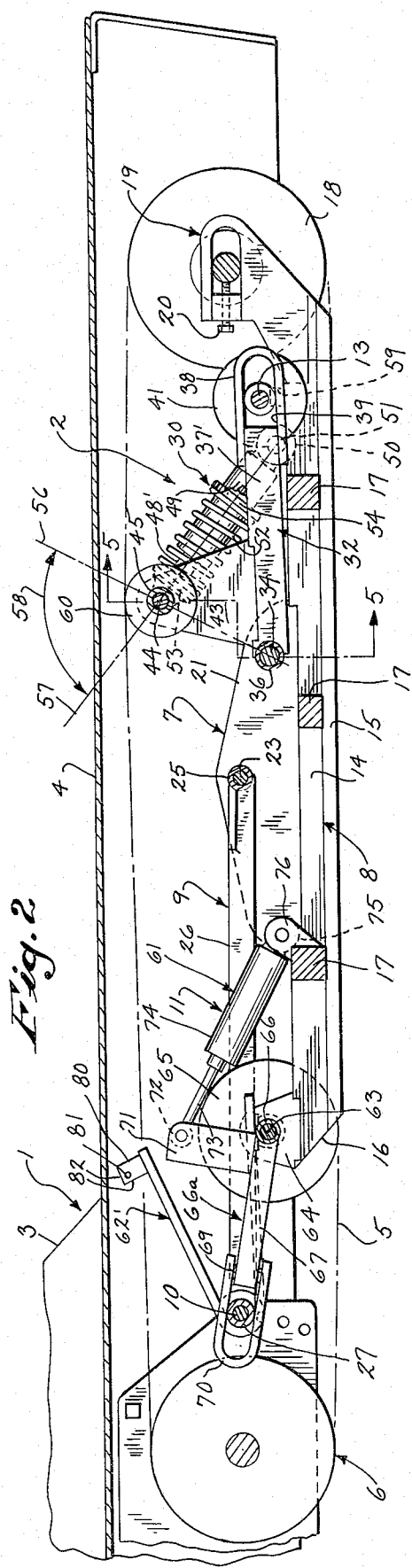

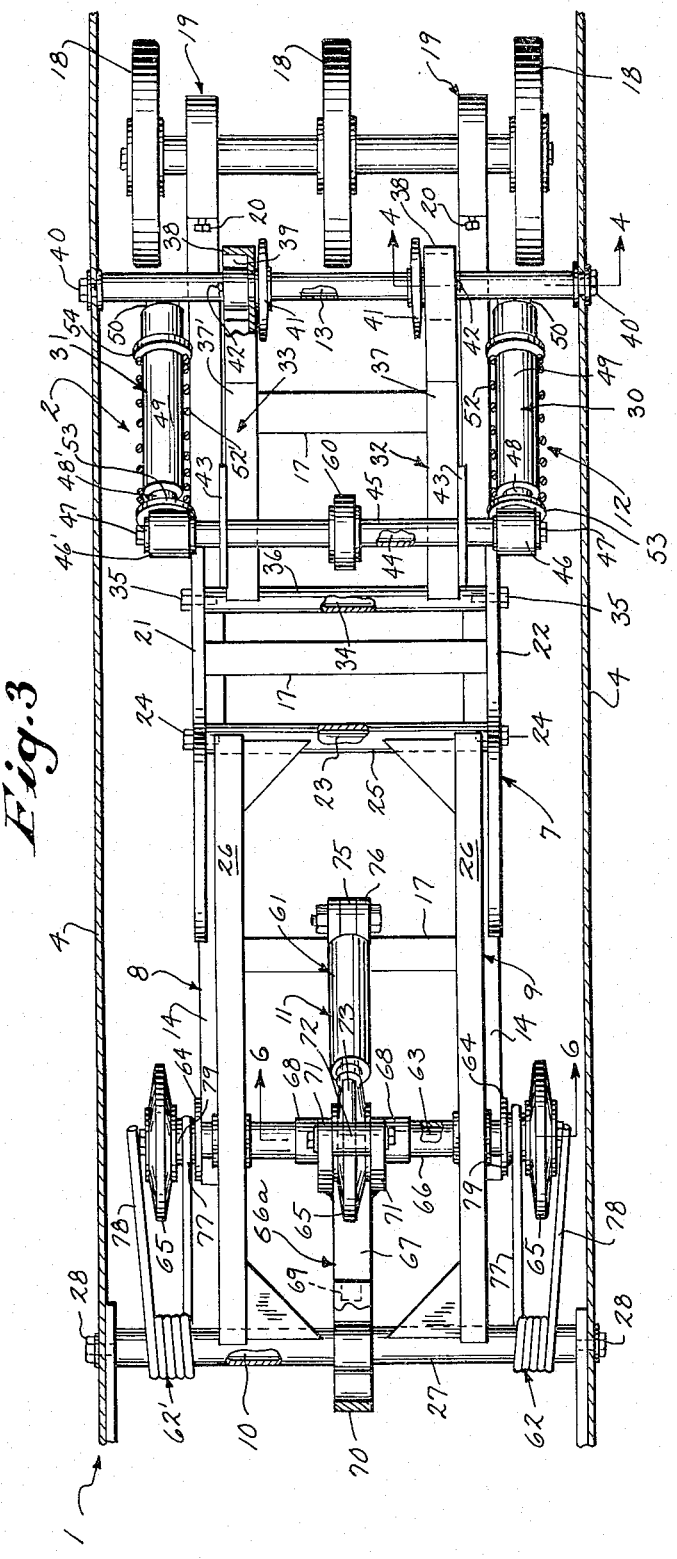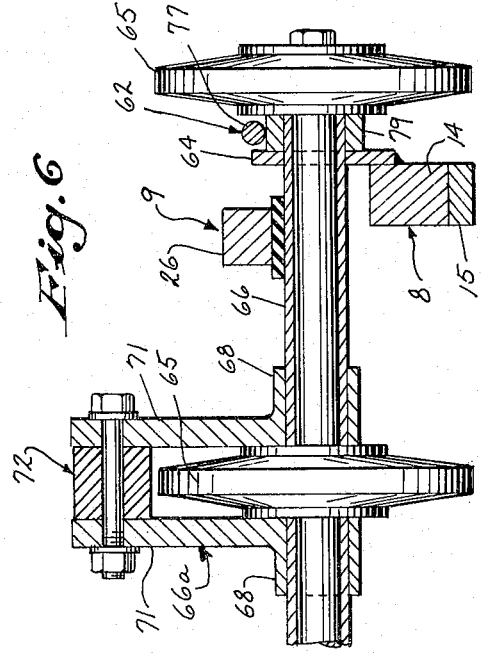

SUSPENSION APPARATUS FOR GROUND ENGAGING DRIVE TRACKS

BACKGROUND OF THE INVENTION

The present invention is directed to a suspension system for a ground engaging drive track and particularly to a slide bar type suspension for supporting a flexible, endless track of a snowmobile or the like.

Snowmobiles and similar all terrain vehicles employ drive tracks such as endless belts mounted within a tunnel in a supporting chassis and have generally employed a bogie wheel suspension or a slide rail suspension system for maintaining proper ground engagement of the track. Slide rail suspension systems are advantageously employed in high speed drive systems to provide maximum lineal support and minimal undulation in the flexible endless drive track.

The suspension system is normally mounted to permit movement within the tunnel in the underside of the chassis with various spring and shock absorbing means provided to impede or restrict the relative rate of movement between the chassis and the drive assembly while simultaneously absorbing the shock forces. The shock absorbing means not only provides a smoother ride but contributes to the stability of the vehicle. This stability of operation is particularly important in connection with snowmobiles and the like when operated at high speeds such as in racing.

In the shock absorbing systems it is desirable to provide a relatively low spring and shock absorbing characteristic during initial bump engagement with an increased rate as the suspension moves relative to the chassis. However, the total system must be maintained with a minimum complexity in order to ensure a long, reliable and practical construction.

SUMMARY OF THE PRESENT INVENTION

The present invention is particularly directed to a resiliently loaded suspension system for track-type vehicles and particularly such a suspension system having a variable spring rate and shock rate which preferably changes progressively to contribute to a very stable and relatively soft riding vehicle. Generally, in accordance with a preferred novel features of the present invention, the suspension system includes separate front and rear spring and shock absorbing assemblies having means to increase the spring rate and shock rate in both assemblies as the suspension unit moves between a full shock or bump position and the full rebound or reset position. Generally, in accordance with the teaching of the present invention, the spring means, and shock means of each front and rear assembly is pivotally interconnected to a chassis axle with a sliding or lost motion responding to relative shock movement between the track and chassis to vary the effective load coupling arm of the spring means and of the shock absorbing means to progressively increase their effectiveness. In addition, the rear assembly preferably provides angular reorientation between the shock absorbing means and the force arm coupled to the rear shock absorber to further increase the effectiveness thereof.

More particularly, in accordance with a particularly novel feature and construction of the present invention, the suspension assembly is pivotally linked to the chasis by a linking arm assembly pivotally attached to a forward anchor axle such that the total suspension assembly essentially follows the arc prescribed by the linking arm unit.

The rear spring and shock absorbing assembly includes a bell crank means pivotally connected to an aft portion of the slide rail means with a relatively long arm extending upwardly and rearwardly with the outermost end connected to the rear axle by a lost motion coupling, which in a preferred construction includes a longitudinal slot mating with the axle. The short arms of the bell crank unit project upwardly with the upper end pivotally connected to one end of a piston-cylinder shock absorber by a suitable pivot connection. The shock absorber extends downwardly and rearwardly with the lower end thereof pivotally interconnected in fixed relation to the slide rail means generally in alignment with the rear axle. A preload coil spring encircles the shock absorbing means with the opposite ends coupled respectively to the cylinder and the piston rod of the shock absorber to urge the chassis and slide rail means to the expanded or full rebound position. Relative vertical movement of the pivotally mounted slide rail means as a result of engaging a bump or the like initiates a sliding movement of the long bell crank arm with respect to the rear axle thereby shorting the effective arm of the bell crank with the resulting increase in the shock and spring rate so as to increase their shock absorbing ability against further impact. Further, shock absorbing movement of the coil spring and the shock absorber results in pivoting of the short crank arm such that its force line or axis is angularly reoriented toward a perpendicular relationship with respect to the axis of the spring and the shock absorbing means. This further increases the relative rate of depression of the spring and shock absorbing means with a further increase in the spring rate and the shock rate.

A similar characteristic is preferably provided at the front shock assembly which includes a shock absorber and separate torsion spring means to preload the suspension to the rebound position. The long arm of the bell crank projects forwardly and upwardly and is similarly coupled with a sliding connection to the front pivot axle. The short arm extends upwardly and is coupled to a similar shock absorber means which extends rearwardly and downwardly and is secured at the opposite end to the front end of the slide rail means. A single shock absorber may be employed. The torsion springs means includes at least one torsion spring coil wound about the front axle with a lower spring arm engaging a forward idler axis of the slide rail means and an upper spring arm engaging the chassis. Relatively collapsing movement of the slide rail means with respect to the chassis results in relative rotation of the lower spring arm upwardly about the axle with the contact point being shortened to increase the spring rate as the slide rail means moves to the full bounce position.

Applicant has found that the suspension system of this invention significantly contributes to the stability and comfort of the ride even when employed in very high speed snowmobile vehicles such as employed in racing and the like. The construction employs readily available and rugged elements and thus provides a very practical suspension system.

BRIEF DESCRIPTION OF DRAWINGS

The drawings furnished herewith illustrate the best mode presently contemplated by the inventor for carrying out the subject invention to which the above advantages and features are clearly disclosed as well as others which will be readily understood from the following description of the illustrated embodiment shown.

In the drawings:

FIG. 1 is a fragmentary side view of a snowmobile chassis with a track suspension of the present invention located therein;

FIG. 2 is a view of the suspension system similar to FIG. 1 with the suspension system in the full bounce position;

FIG. 3 is a plan view of the suspension system;

FIG. 4 is a fragmentary sectional view taken on line 4—4 of FIG. 3 and more clearly illustrating the rear crank arm coupling;

FIG. 5 is a fragmentary sectional view taken on line 5—5 of FIG. 2 and more clearly illustrating the rear shock absorber connection; and FIG. 6 is a fragmentary sectional view taken generally on line 6—6 of FIG. 3 and illustrating the forward crank mounting.

DESCRIPTION OF THE ILLUSTRATED EMBODIMENT

Referring to the drawings and particularly to FIG. 1, a snowmobile 1 is partially illustrated with the forward or front portion removed for purposes of more clearly illustrating a particularly novel ground engaging track assembly 2 constructed in accordance with the teaching of the present invention. The snowmobile 1 includes a supporting chassis 3 extending rearwardly from the forward portion not shown within which the drive engine, steering mechanism and the like is provided. The chassis 3 has a tunnel-like portion 4 within which the ground engaging track assembly 2 is suspended. The ground engaging track assembly 2 includes an endless drive belt or track 5 interconnected to the chassis 3 by a front drive assembly 6. The engine, not shown, is coupled through any suitable means to drive the assembly 6 and thereby cause rotation of the track 5 for propelling of the vehicle over the ground. The drive track or assembly 2 further includes a slide rail suspension apparatus 7 located within the track 5 and pivotally interconnected to the front drive assembly 6 and coupled to the rear portion of the chassis to provide a resilient engagement of track 5 with the ground. The slide rail suspension apparatus 7 particularly includes a slide rail unit 8 engaging the lower run of track 5 and pivotally mounted by a single linking arm unit 9 to a forward axle 10. The apparatus 7 further includes a resiliently loaded front shock absorbing unit 11 and a separate resiliently loaded rear shock absorbing unit 12 interconnected between the slide bar or rail unit and front and rear chassis axles 10 and 13. The slide rail unit 8 pivots about the front axle 10 and the shock absorbing units 11 and 12 move to create a variable spring rate and variable shock rate which establishes increasing effectiveness in the shock absorbing characteristics and spring support as the unit moves from a full rebound position of FIG. 1 to a full bounce position of FIG. 2.

More particularly, the suspension apparatus 7 and particularly the slide rail unit 8 includes a pair of similar slide rails 14 having lower wear elements 15 extending along the lower run of the track 5. Each of the rails 14 includes a forward upwardly inclined portion 16 in accordance with the usual construction. Laterally extending connecting frame members 17 interconnect the slide rails 14 to provide a rigid spacing of the slide rails in proper relationship in engagement with the track 5. A plurality of rear guide wheels 18 are secured to the trailingmost end of the slide rails 14 with an adjustable tension support 19 for longitudinal setting of guide wheels 18. Track tension control bolt units 20 of the support 19 longitudinally adjust the guide wheels 18 relative to the slide rails 14 for adjustment of the tension in the track 5 relative to the front drive assembly 6.

The suspension apparatus 7 further includes centrally located mounting frames or brackets 21 and 22 connected to the center of the tops of the slide rails 14 and pivotally interconnected to the linking arm unit 9. A hollow pivot shaft 23 is interiorly threaded at the ends and secured between the brackets 21 and 22 by attachment bolts 24. The arm unit 19 includes a pivot sleeve 25 journaled on shaft 23 with a pair of arms 26 extending forwardly to a front pivot sleeve 27 which is journaled on the front axle 10 which is fixedly attached to the chassis 3. Thus, the front axle 27 is shown as a tube member which is interiorly threaded to receive mounting bolts 28 which pass through appropriate openings in the chassis 3. The slide rail unit 8 is therefore pivotally mounted to move on an arcuate path 29 as it moves between the positions of FIGS. 1 and 2. The arcuate movement moves the slide rail unit rearwardly relatively to the front axle 10 and accentuates the variable rate characteristics of the rear shock absorbing unit 12, as presently described.

Referring to FIG. 3, the rear shock absorbing means or unit 12 includes a pair of similar shock absorbers 30 and 31 connected between the rear of the brackets and the rear axle by similar bell cranks 32 and 33. The shock absorber 30 and connecting bell crank 32 are described and the corresponding elements of absorber 31 and crank unit 33 are identified by corresponding primed numbers.

More particularly, a bell crank pivot shaft 34 is fixed between the mounting frames 21 and 22. The shaft is a hollow tubular member which is interiorly threaded to receive clamping bolts 35 extended inwardly through the brackets 21 and 22 and threading into the pivot shaft to firmly fix the shaft in fixed relation between the side rails.

The bell crank 32 is a generally L-shaped member formed with a pivot sleeve 36 pivoted on the shaft 34 between the mounting brackets 21 and 22. The bell crank 32 has a relatively long crank arm 37 which extends rearwardly and upwardly into a sliding coupling with the rear chassis axle. In the illustrated embodiment of the invention, the crank arm 37 has a box-like cross section and the U-shaped strap 38 has its ends secured to the outer end of the arm as by welding or the like. The strap 38 projects outwardly to define an encircling coupling loop or slot 39 about the axle 13. The U-shaped strap provides corresponding axle engagement in the alternate positions of FIGS. 1 and 2.

The axle 13 is a hollow tube secured to the chassis 4 similar to the mounting of the front axle 10 with the outer ends of the axle 13 abutting the chassis and firmly affixed to the chassis by bolts 40.

The crank arm 37 is thus allowed to move horizontally between the limits provided by the coupling slot 39 defined by the U-shaped strap 38 as the axle 13 moves vertically relative to the slide rail unit 8 and particularly pivot shaft 34.

In the illustrated embodiment of the invention, the outer end of crank arm 37 is retained against axial movement on the axle 13 by an abutting idler wheel 41 to the inner side of the crank end strap 38 and suitable clips 42 provided to the opposite side of the strap 38 on the axle 13.

The crank 32 further includes a short crank arm 43 in the form of a generally triangular plate welded or otherwise affixed to the pivot sleeve 36 and to the crank arm 37. The arm 43 extends generally perpendicular to the long crank arm 37. The outermost end of the short crank arm 43 is secured to a pivot sleeve 44 mounted on a shock absorber shaft 45 which extends laterally across the side rail unit 8. The pair of shock absorbers 30 and 31 are secured one each to the opposite ends of the shaft 45 for simultaneous and interrelated action with respect to the cranks 32 and 33.

The shock absorber 30 may be well known piston-cylinder construction and includes a tubular bushing or fitting 46 clamped onto the outer end of the shock absorber shaft 45 as by a clamping washer and bolt unit 47, in abutting relation to the crank sleeve 44 of the adjacent crank 32. The bushing 46 in turn is welded or otherwise integrally formed with the outermost end of the piston rod 48 of the shock absorber 30. The piston rod 48 is coupled to a suitable piston, not shown, slidably mounted within a cylinder 49. The opposite or closed head of the cylinder 49 is provided with a cylindrical sleeve 50 which is pivotally mounted to the top of the side rail by a suitable cross-shaft or axle 51 secured to the rearmost end of the slide rails 14.

A preload spring 52 encircles the cylinder 49 and piston rod 48 between a washer and flange unit 53 at the piston rod bushing 46 and an adjustable spring loading cam 54 encircling the cylinder. The illustrated cam unit is generally a tube encircling the cylinder and having the outer surface configured or formed with a plurality of circumferentially spaced steps or cam notches which are offset axially of the cylinder. The notches selectively mate with a pair of oppositely projecting cam lugs 55 on the surface of the cylinder. Rotation of the cam 54 adjustably positions the offset notches to vary the compression and therefor preload of the adjustable coil spring 52 and shock absorber. This system is similar to that employed in many spring loaded motorcycle shock absorbers.

The shock absorber 30 extends downwardly from the upper end of the short crank arm 48 and rearwardly to form an oppositely extending arm with respect to the long crank arm 37. Thus, with the chassis 4 in a full up or rebound position relative to the side rail unit 8 as a result of the preload springs 52, the shock absorber 30 is fully extended and the long crank arm 37 is located with the rear axle 13 in the outermost end of the coupling strap 38, as shown in FIG. 1.

Any relative vertical force acting to compress the suspension apparatus 7 which is greater than the force of the coil springs 52 and 52' tends to collapse the apparatus by either moving of the side rail unit 8 upwardly or the chassis 4 downwardly. The collapsing movement causes the long crank arm 37 to move relative to the axle 13. As the unit also swings on the arc 29 determined by the swing arm unit 9, the rear axle 13 also moves within the coupling strap 38. The pivot shaft 36 of the bell cranks 32 and 33 correspondingly move upwardly and closer to the rear axle 13. This effectively provides a progressive shortening of the length of the bell crank arm 37. The shortening of the arm 37 creates an increase in the shock rate and in the spring rate of the shock absorbers 30 and 31 and springs 52 and 52'. This increase, of course, results in a greater ability to absorb impact forces.

Further, the relative collapsing of the shock absorbers 30 and 31 and the spring long crank arm 37 and 37' results in the rotation of the short crank arms 48 and 48' with the force axis or line 56 moving to a more perpendicular position relative to the shock absorber axis 57 and in the outer limit a perpendicular relationship as shown in FIG. 2. This change in the force angle 58 results in a further increased rate of depression of the shock and spring as the apparatus moves to the full bounce position with a related further increase in the spring rate and in the shock rate.

In a practical construction of a racing snowmobile with a suspension system as shown in the drawings, there was a total increase of about 25 percent in the spring rate and in the shock rate between the full "bump" position of FIG. 2 and the full rebound position of FIG. 1. Generally, the system appeared to include approximately 10 percent of rate change as a result of the angular change in the orientation of the axis of the short bell crank arm and the common axis of the spring and the shock absorber. The other 15 percent of the change was contributed by the shortening of the long crank arm as a result of the relative movement of the rear axle 33 within the variable coupling.

Suitable rubber bumpers 59 or the like are preferably provided on the slide rail 14 in alignment with the axle 13 to positively prevent metal to metal contact between the collapsing resilient support means and the slide rail means as such. The guidewheels 41 on the rear axle 13 support the track 5 in the expanded position. As the rear spring and shock absorbing unit collapses to the position of FIG. 2, a support wheel 60 on the crank arm shaft 45 engages the track 5 to provide support thereof in the collapse or bounce position.

The front spring and shock absorber assembly or unit 11 provides a similar variable rate support. The front unit generally includes a single shock absorber 61 located centrally of the slide rail unit 8 and a separate pair of torsion springs 62 and 62' biasing of the assembly to the rebound position of FIG. 1. The front shock absorber and spring assembly is interconnected to the slide rail unit 8 through a front idler axle 63 secured between a pair of front mounting plates 64 on the forwardmost end of the individual slide rails 14. Three laterally spaced guidewheels 65 engage the bottom run of the front portion of the track 5 with suitable sleeve spacer 66 located between the several guidewheels to properly space the several elements.

Referring to FIGS. 3 and 6, the front shock absorber unit 61 includes a bell crank 66a having a pair of interconnecting long crank arms 67 secured to pivot sleeves or hubs 68 and rotatably mounted upon the front idler axle sleeves 66. The relatively long crank arms 67 project forwardly toward the front pivot axle 10 and are interconnected to each other by a cross bracket assembly 69 at the outermost end. A U-shaped coupling strap 70 telescopes over the front axle 10 and sleeve 27 and is welded or otherwise rigidly secured to the interconnecting bracket 69 to form a slotted coupling of the long arms 67 of the bell crank 66.

The bell crank 66a further include short arms 71 welded or otherwise interconnected to the arms 69 and at the upper end to the opposite sides of a shock bushing 72 secured to the outer end of the piston rod 73 of the front shock absorber 11 similar to the coupling of the rear shock absorber 32. The front shock absorber 11 also includes a cylinder 74, the closed head of which includes a cylindrical pivot bushing 75 interconnected to a pivot bracket 76 on one of the crossbars 17 of the slide rail unit 8. In the normal down or rebound position of FIG. 1, the crank 66a is pivoted in a counter clockwise direction with the shock absorber in a fully retracted position. The long crank arm 67 is retracted rearwardly with respect to the front axle which is located within the forward end of the coupling slot of strap 70. As the chassis 4 moves downwardly or the slide rail unit 8 moves upwardly into the chassis, the unit 8 moves upwardly along the arc of the arm unit 9, the common pivot axle 63 of the cranks moving forwardly, such that the crank pivot axis moves closer to the forward anchor axle 10. This effectively shortens the length of the long crank arms 67, and as with the rear bell crank assembly, increases the shock rate as the slide rail unit 8 moves to the full bump position shown in FIG. 2.

The forward portion of the slide rail unit 8 is bias to the expanded or full rebound position of FIG. 1 by the pair of torsion springs 62 and 62' each of which is similarly constructed. Thus, the torsion spring 62 is looped about the front axle 10 and sleeve 27 with a plurality of spring turns. The opposite ends of the spring 62 are straight, integral lengths which project rearwardly to define a pair of angularly spaced spring arms or levers 77 and 78, tending to expand in opposite directions. The lower arm 77 projects rearwardly over the slide rail axle 63 and bears upon a wear sleeve 79 of steel or the like provided on the axle 63, as shown most clearly in FIG. 6. The upper spring arm 78 projects upwardly toward the base of the chassis 4 and engages an adjustable tension stop element 80. In the illustrated embodiment of the invention, element 80 is a rectangular box which is fixedly secured to the side wall of the chassis 4 as by a bolt unit 81. The bolt opening in the rectangular box is offset from the center and is generally located centrally of one quadrant of the box. It thus provides for different distances with respect to the four side walls 82 of the box 80. The box is bolted to the housing with a selected one of its four sides facing downwardly of engagement with the spring arm 78, to adjust the initial torsion or the bending of the arm 78 relative to the chassis 4 and the front axle 63 and to thereby provide predetermined preloading of the front torsion spring support. As the slide rail unit 8 moves between the full rebound position of FIG. 1 to the full bump position of FIG. 2, the torsion spring arms 77 and 78 collapse, with the lower spring arm 77 rotating relatively upwardly toward the chassis. The slide rail unit 8 moves rearwardly relatively to the front anchor axle 10 on the arc of the swing arm unit 9. The front slide rail axle 63 in moving upwardly reduces the spacing from the forward anchor axle 10 more than the slight rearward movement of the unit on the arc of hinge unit 9. As a result, the contact point of the lower spring arm 77 moves closer to the anchor axle 10 with a corresponding shortening in the effective length of the spring arm 77. The shortening of the spring arm 77 reduces the spring rate as the unit moves to the full bump position of FIG. 2, thereby increasing the absorbing characteristic of the spring.

For example, in a practical construction the springs were formed with arms of approximately 4 inches with a movement along the contact point of about ¾ inch between the full rebound and full bump positions. This change and the related change in the length of the long crank arm of the front shock absorber were related to an increase in the spring rate and the shock rate of approximately 15 to 18 percent.

In summary, in the illustrated embodiment of the invention, the slide rail unit 8 is formed as a separate unit which is anchored to the chassis along a single pivot axle 10 such that the total unit moves up and down within the tunnel 4 of the chassis 3 along the arc 29 described by the rear end of the linking spring arms 26. This positively moves the slide rail unit 8 to further accentuate the shortening of the rear bell crank arms 37 as the unit moves to the full bump position to thereby accentuate the shock and spring rate characteristic of the rear shock assembly.

The suspension system provides separate variable rate for the forward and rear shock absorber and spring support means. Although the units differ in construction, as a result of space, drive design considerations and the like, both produce a gradually increasing spring rate and a gradually increasing shock absorber rate as the slide rail unit moves from the full rebound position of FIG. 1 upwardly into the tunnel 4 toward the full bump position of FIG. 2. The structure has been found to provide a very reliable and stable suspension for a highspeed snowmobile.

The supporting system employs readily available components and units which can be reliably employed in the severe environments encountered with the track driven vehicles and the like.

Various modes of carrying out the invention are contemplated as being within the scope of the following claims,, particularly pointing out and distinctly claiming the subject matter which is regarded as the invention.

I claim:

1. A suspension apparatus for supporting a flexible and endless drive track within a vehicle chassis comprising:
   a support means mounted to engage the lower run of the endless drive track,
   a resilient support assembly including a support axle having means for securement to the chassis, a crank means pivotally secured to the support means and having a first crank arm pivotally coupled to the axle with a lost motion coupling and having a second angularly related crank arm, said first and second crank arms being operatively connected for interrelated, corresponding, angular movement, and a shock absorbing means secured to the outer portion of said second crank arm and to the support means.

2. The suspension apparatus of claim 1 wherein said support axle is a rear axle, said first crank arm extends rearwardly to the axle and said second arm extends upwardly from said first crank arm, said shock absorbing means being secured to the outer portion of said second crank arm and extending rearwardly and downwardly to the support means rearwardly of said pivotal securement of the crank means to the support means.

3. The suspension apparatus of claim 2 including a preload spring means secured to the shock absorbing means and having a common force axis with said shock absorbing means.

4. The suspension system of claim 1 wherein said support axle is a front axle, and having a swing arm assembly pivotally secured to the front axle and extending rearwardly and pivotally secured to the support means, said crank means being pivotally secured to the support means forwardly of the pivotal securement of the swing arm assembly and said first crank arm extending forwardly and upwardly to the front axle, said second crank arm extending upwardly, said shock absorbing means being pivotally secured to the second crank arm and to the support means.

5. The suspension system of claim 4 having torsion spring means on the axle, said torsion spring means having opposite lever means bearing on the chassis and the support means to resiliently preload said shock absorbing means.

6. A suspension apparatus for supporting a flexible and endless drive track to a vehicle chassis, comprising a support means to engage the lower run of the endless drive track, and a resilient shock absorber means connected to the support means and having means for connection to the chassis to support the drive track spaced from the chassis and collapsible in response to a vertical force on the track to permit the relative movement of the drive track toward the chassis adjacent to the shock absorber means and simultaneously establishing a variable rate shock absorbing support with an increasing shock rate during at least a portion of said relative movement of the drive track toward the chassis as the result of collapsing of the track adjacent the shock absorbing means.

7. The suspension apparatus of claim 6 wherein said shock absorber means includes a progressively increasing shock rate.

8. The suspension apparatus of claim 6 including a spring means connected to the support means and to the chassis and establishing a variable rate spring support with an increasing spring rate during at least a portion of movement of the drive track toward the chassis.

9. The suspension apparatus of claim 8 wherein said spring means includes a progressively increasing spring rate.

10. A slide rail suspension system for a ground engaging drive track means comprising a mounting axle, a slide rail unit for engaging the lower run of the track means, a bell crank means having a pair of interconnected crank arms pivotally attached to the slide rail unit at the common connection of the crank arms, a sliding coupling connecting the first crank arm to the mounting axle, a shock absorbing means secured to the slide rail unit and to the second crank arm and creating shock absorbing movement in response to upward bounce movement of the slide rail unit, a resilient preload means coupled to expand the slide rail unit relative to the chassis, said sliding coupling shortening the effective length of the crank arm to increase the shock rate of the shock absorbing means.

11. The slide rail suspension system of claim 10 wherein said resilient preload means has a spring arm means slidably connected to said axle and having an effective decreasing length in response to said bounce movement to increase the spring rate of the preload means.

12. The slide rail suspension system of claim 10 wherein the rotation of the crank arm progressively reorients the second crank arm to extend perpendicular to the force axis of the absorbing means and thereby further increasing the shock rate of the shock absorbing means.

13. The slide rail suspension system of claim 10 including a pivotal support unit pivotally connected to the axle and to the slide rail unit to pivotally support the slide rail unit to the chassis.

14. A slide-unit suspension apparatus for maintaining a drive track in ground engagement, comprising a slide rail unit for slidably engaging the lower track run and having a centrally located mounting shaft, a forward mounting axle, a swing arm unit pivotally mounted on said shaft and said forward mounting axis to support the slide rail unit, a rear mounting axle, a rear bell crank unit pivotally mounted to the slide rail unit and having a first crank arm projecting rearwardly and upwardly to the rear mounting axle, a sliding pivot coupling between the rear axle and the first crank arm, said rear bell crank unit having a second crank arm projecting upwardly forwardly of the first crank arm, a rear piston-cylinder shock absorber pivotally connected to the upper end of the second crank arm and to the slide rail unit, said rear shock absorber extended downwardly and rearwardly from the second crank arm to the slide rail unit, and a compression coil spring encircling said shock absorber and coupled to the piston portion and to the cylinder portion and stressed to extend the shock absorber.

15. The slide rail suspension system of claim 14 including a pair of said rear piston-cylinder shock absorbers and a pair of said rear bell crank units located in laterally spaced relation to the opposite sides of said slide rail unit.

16. The slide rail suspension system of claim 15 wherein said shock absorber is retracted in the expanded rebound position and extended in a retracted bounce position of said slide rail unit.

17. A slide rail suspension apparatus for maintaining a drive track in ground engagement, comprising a slide rail unit for slidably engaging the lower track run and having a centrally located pivot mounting means, a track support having a forward mounting front axle, a swing arm unit pivotally mounted on said pivot mounting means and said forward mounting axle to support the slide rail unit for arcuate movement, a bell crank unit having a pivot connection to the forward end of the slide rail unit, said bell crank unit having a first crank arm extending forwardly and upwardly to the front axle, a sliding pivot coupling between the crank arm and the front axle, said bell crank unit having a second arm extending upwardly, a shock absorber having a piston rod and cylinder including means pivotally connecting the piston rod and cylinder to the second crank arm and to the slide rail unit, a torsion spring having a coiled portion located on the front axle and an upper spring arm and a lower spring arm, said upper spring arm projecting rearwardly and upwardly into bearing engagement with the track support, said lower spring arm projecting rearwardly and downwardly into bearing engagement with the front portion of the slide rail unit.

18. The slide rail suspension system of claim 17 wherein said shock absorber is located centrally of the width of the slide rail unit, said shock absorber being retracted in an expanded rebound position and extended in a retracted bounce position of said slide rail unit.

19. The slide rail expansion apparatus of claim 17 having a pair of said torsion springs located at opposite ends of the front axle, said slide rail unit having a front idler shaft, the second arm of said springs bearing on the idler shaft, said bell crank unit being pivotally connected to said idler shaft centrally of said springs.

20. The slide rail suspension system of claim 17 having a rear mounting axle, a rear bell crank unit pivotally mounted to the aft portion of the slide rail unit and having a first crank arm projecting rearwardly and upwardly to the rear mounting axle, a sliding pivot coupling between the rear axle and the first crank arm, said rear bell crank unit having a second crank arm projecting upwardly forwardly of the first crank arm, a rear pistoncylinder shock absorber pivotally connected to the upper end of the second crank arm and to the slide rail unit, said rear shock absorber extended downwardly and rearwardly from the second crank arm to the slide rail unit, and a compression coil spring encircling said shock absorber and coupled to the piston portion and to the cylinder portion and stressed to extend the shock absorber.

* * * * *